(12) United States Patent  
Lai

(10) Patent No.: US 9,122,447 B2  
(45) Date of Patent: Sep. 1, 2015

(54) EXPANSION DOCK AND PORTABLE ELECTRONIC SYSTEM THEREWITH

(71) Applicant: Wistron Corporation, New Taipei (TW)

(72) Inventor: Cheng-Yang Lai, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 199 days.

(21) Appl. No.: 14/058,298

(22) Filed: Oct. 21, 2013

(65) Prior Publication Data

US 2015/0055290 A1  Feb. 26, 2015

(30) Foreign Application Priority Data

Aug. 20, 2013 (TW) .............................. 102129799 A

(51) Int. Cl.  
*G06F 1/16* (2006.01)

(52) U.S. Cl.  
CPC .................................. *G06F 1/1632* (2013.01)

(58) Field of Classification Search  
CPC ...................................................... G06F 1/1632

USPC .................................................... 361/679.43  
See application file for complete search history.

(56) References Cited

U.S. PATENT DOCUMENTS

| 8,780,546 B2* | 7/2014 | Zhou ......................... 361/679.41 |
| 2008/0304688 A1* | 12/2008 | Kumar ........................... 381/370 |
| 2012/0134102 A1* | 5/2012 | Sullivan .................... 361/679.43 |
| 2014/0002977 A1* | 1/2014 | Noguchi et al. .......... 361/679.09 |
| 2015/0043155 A1* | 2/2015 | Liang et al. .............. 361/679.43 |

\* cited by examiner

*Primary Examiner* — Anthony Q Edwards  
(74) *Attorney, Agent, or Firm* — Winston Hsu; Scott Margo

(57) ABSTRACT

The present invention discloses an expansion dock including a base, a socket, an expansion platform and a driving mechanism. The socket is installed on a side of the base and pivoted to the base. A portable electronic device can be inserted into the socket. The expansion platform is installed inside the base and protrudable from the side of the base. The driving mechanism drives the expansion platform to protrude from the side of the base as the portable electronic device is inserted into the socket and pivoted to a predetermined angle relative to the base.

18 Claims, 6 Drawing Sheets

EXPANSION DOCK AND PORTABLE ELECTRONIC SYSTEM THEREWITH

BACKGROUND OF THE INVENTION

1. Field of the Invention

The present invention is to provide an expansion dock and a portable electronic system therewith, and more especially, to an expansion dock including an expansion platform being protrudable from a side of a base and a portable electronic system therewith.

2. Description of the Prior Art

With the growing of the touch panel industry, a tablet computer with a touch panel becomes popular. A user moves fingers on the touch panel of the tablet computer for inputting touch commands, such as word processing, cursor slipping, zooming in or zooming out. In recently years, manufacturers design an external keyboard dock for docking with the tablet computer so that the user can not only operate the tablet computer through the touch panel, but also can operate the tablet computer with the external keyboard dock as a traditional notebook computer, so as to expand application of the tablet computer. However, for preventing the table computer from being fallen as inserting into the external keyboard dock, it often needs to increase a weight of the external keyboard dock. For example, a counterweight can be disposed on the external keyboard dock. Otherwise, some functions of the tablet computer are reduced for decreasing a weight of the tablet computer so as to prevent the weight of the tablet computer from exceeding in the weight of the external keyboard dock, which results in a heavy top of the tablet computer so that the tablet computer easily falls down. Furthermore, a socket of the external keyboard dock in which the tablet computer is inserted is disposed on an upper surface of the external keyboard dock by a distance far away from an end of the external keyboard dock, and it reduces mechanical design flexibility. For example, there is no mechanical space for a palm rest. In addition, it is inconvenient in carriage because of the increase of the weight of the external keyboard dock. Reduction of the functions of the tablet computer for decreasing the weight of the tablet computer cannot meet requirements for multifunction and powerful processing performance of an information technology product. It is a significant issue to design an expansion dock wherein mechanical space can be effectively utilized and capable of supporting the tablet computer effectively without increasing the counterweight or decreasing the weight of the tablet computer.

SUMMARY OF THE INVENTION

The claimed invention is to provide an expansion dock and a portable electronic system therewith for solving the above drawbacks.

According to the claimed invention, the expansion dock includes a base, a socket, an expansion platform and a driving mechanism. The socket is installed on a side of the base and pivoted to the base, and a portable electronic device is inserted into the socket. The expansion platform is installed inside the base and protrudable from the side of the base. The driving mechanism is for driving the expansion platform to protrude from the side of the base as the portable electronic device is inserted into the socket and the portable electronic device is pivoted to a predetermined angle relative to the base.

According to the claimed invention, a center-of-gravity position of the portable electronic device is located between a side of the expansion platform away from the base and the side of the base for preventing the portable electronic device from being fallen, as the portable electronic device is pivoted to the predetermined angle relative to the base and the extension platform protrudes from the side of the base.

According to the claimed invention, the driving mechanism includes a driving component, an engaging component and a pressing component. The driving component is installed inside the base and for pushing the expansion platform to protrude from the side of the base. The engaging component is pivotally installed inside the base for engaging with a slot of the expansion platform so as to constrain a movement of the expansion platform. The pressing component is installed inside the socket for pushing the engaging component to pivot so as to detach from the slot of the expansion platform, so that the driving component pushes the expansion platform to protrude from the side of the base, as the portable electronic device is inserted into the socket and pivoted to the predetermined angle relative to the base.

According to the claimed invention, the driving mechanism further includes a restoring component connected to the pressing component for restoring the pressing component to an initial position as the portable electronic device is detached from the socket.

According to the claimed invention, the restoring component is a spring component.

According to the claimed invention, the driving component is a spring component.

According to the claimed invention, the driving mechanism includes a driving component, a pivoting component an engaging component and a pressing component. The driving component is installed inside the base and for pushing the expansion platform to protrude from the side of the base. The pivoting component is connected to the socket and for driving the socket to pivot relative to the base. The engaging component is connected to the pivoting component and rotates with the pivoting component, and the engaging component engages with a slot of the expansion platform so as to constrain a movement of the expansion platform. The pressing component is installed in the socket and is pressed to drive the engaging component to engage with the slot of the expansion platform as the portable electronic device is inserted into the socket, and the engaging component is pivoted to detach from the slot of the expansion platform so that the driving component drives the expansion platform to protrude from the side of the base, as the portable electronic device is inserted into the socket and the pivoting component drives the socket to pivot to the predetermined angle.

According to the claimed invention, the driving mechanism further includes a restoring component connected to the engaging component, and the restoring component is for restoring the engaging component to an initial position as the portable electronic device is detached from the socket.

According to the claimed invention, a display interface, an input interface, a speaker unit or an antenna unit is disposed on the expansion platform.

According to the claimed invention, the portable electronic system includes a portable electronic device and an expansion dock connected to the portable electronic device. The expansion dock includes a base, a socket, an expansion platform, and a driving mechanism. The socket is installed on a side and pivoted to the base, and the portable electronic device is inserted into the socket. The expansion platform is installed inside the base and protrudable from the side of the base. The driving mechanism is for driving the expansion platform to protrude from the side of the base as the portable electronic device is inserted into the socket and the portable electronic device is pivoted to a predetermined angle relative to the base.

The claimed invention is to provide the expansion dock and the portable electronic system therewith. As both conditions of that the portable electronic device is inserted into the socket and the portable electronic device is pivoted to the predetermined angle relative to the base are achieved, the expansion platform just can protrude from the side of the base, thus the bottom area of the expansion dock is increased and the center-of-gravity position can be changed, so as to prevent the portable electronic device from being fallen while rotating. In addition, multifunction modules can be disposed on the expansion platform, and the corresponding functions can be operated as the expansion platform protrudes from the side of the base. In conclusion, the present invention is to provide the expansion dock capable of utilizing the mechanical space effectively and capable of supporting the portable electronic device effectively without increasing any counterweight or decreasing a weight of the portable electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
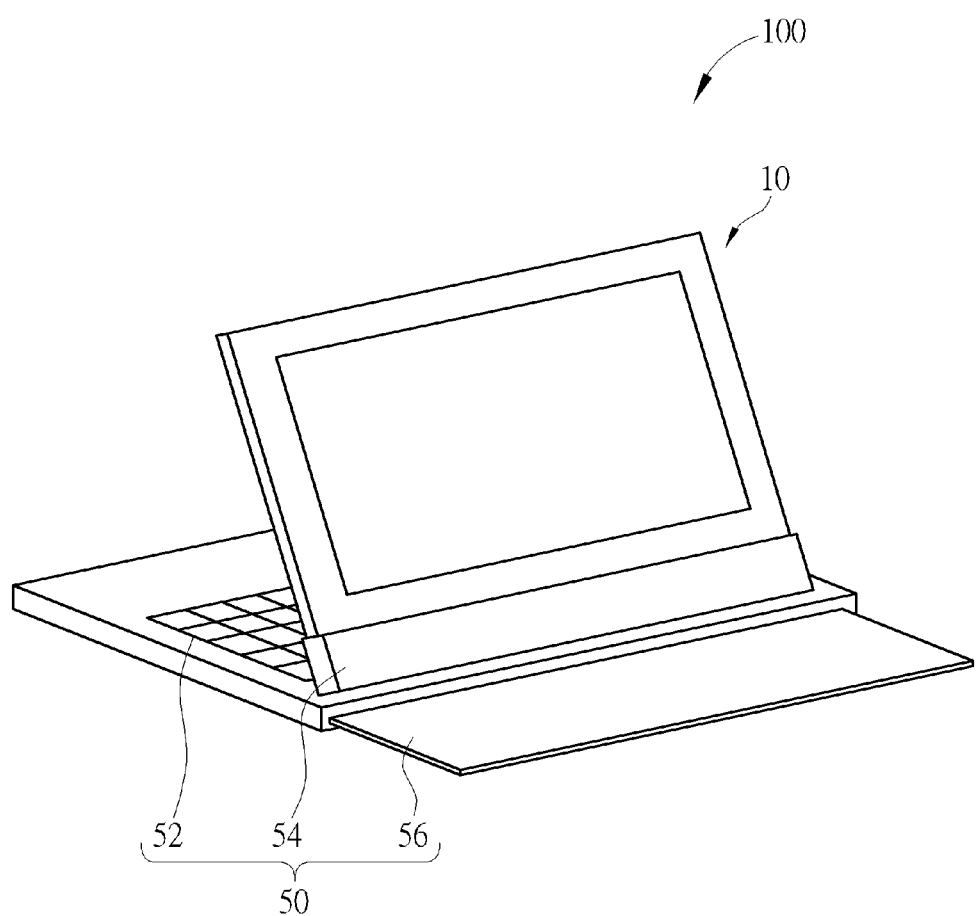
FIG. 1 is a schematic diagram of a portable electronic system according to an embodiment of the present invention.

Please refer to FIG. 1. FIG. 1 is a schematic diagram of a portable electronic system 100 according to an embodiment of the present invention. The portable electronic system 100 includes a portable electronic device 10 and an expansion dock 50. The portable electronic device 10 can be a tablet computer, and the expansion dock 50 can be an external keyboard dock which the portable electronic device 10 can be inserted in. The expansion dock 50 includes a base 52, a socket 54 and an expansion platform 56. The socket 54 is installed on a side of the base 52 and pivoted to the base 52, and the portable electronic device 10 is inserted into the socket 54 for communicating with the expansion dock 50. Since the socket 54 is not disposed on an upper surface of the base 52 by a distance far away from an end of the base 52, it can increase mechanical design flexibility. For example, a mechanical space can be reserved for a palm rest, and the portable electronic system 100 can be operated as a notebook computer. The expansion platform 56 is installed inside the base 52 and protrudable from the side of the base 52.

Figure 2:
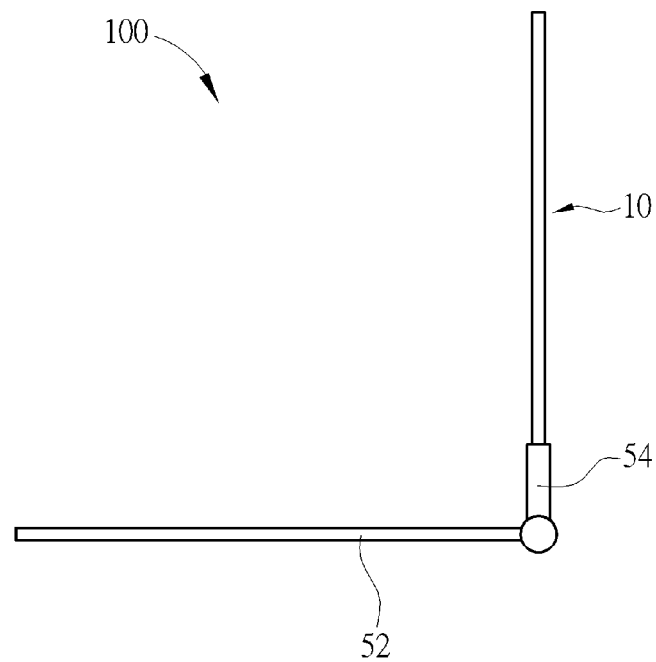
FIG. 2 and FIG. 3 are lateral diagrams of a portable electronic device and a base in different relative positions according to the embodiment of the present invention.
Figure 3:
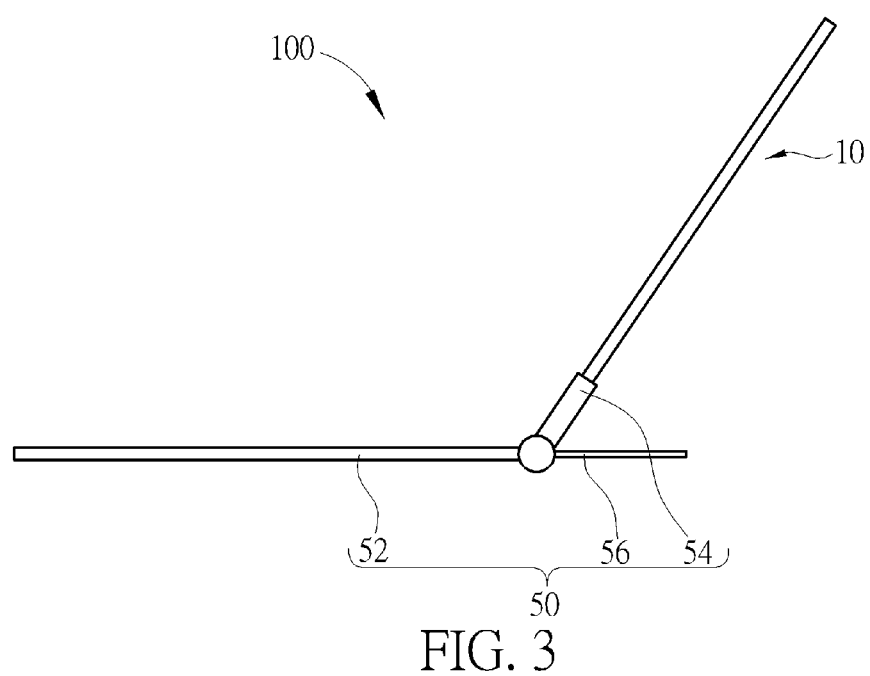
Figure 4:
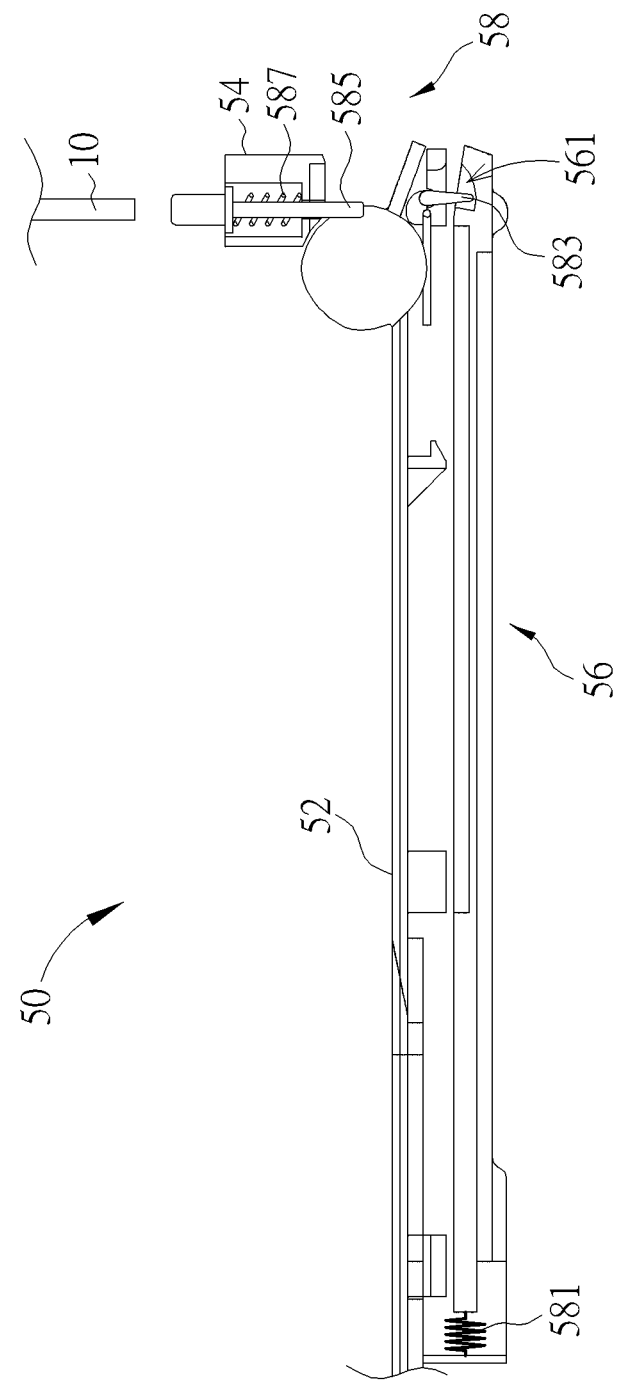
FIG. 4 is a partial structural diagram illustrating that the portable electronic device has not been inserted into a socket according to the embodiment of the present invention.
Figure 5:
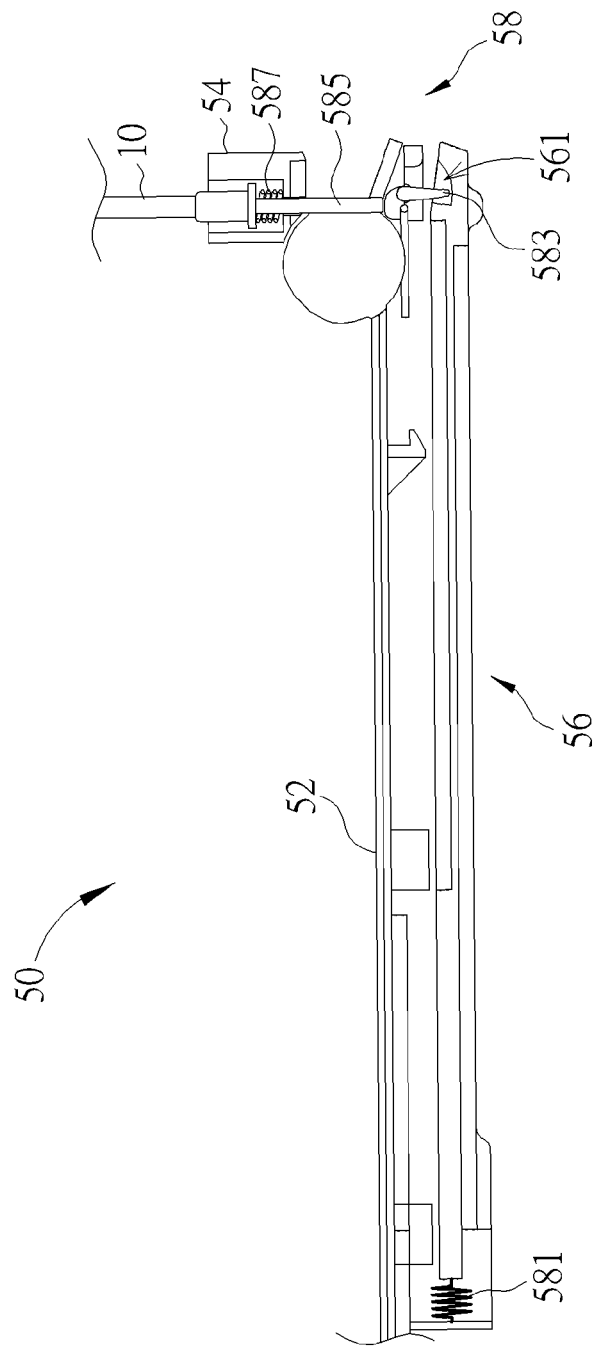
FIG. 5 and FIG. 6 are partial structural diagrams illustrating that the portable electronic device is inserted into the socket and the portable electronic device and the base 52 are in different relative positions according to the embodiment of the present invention.
Figure 6:
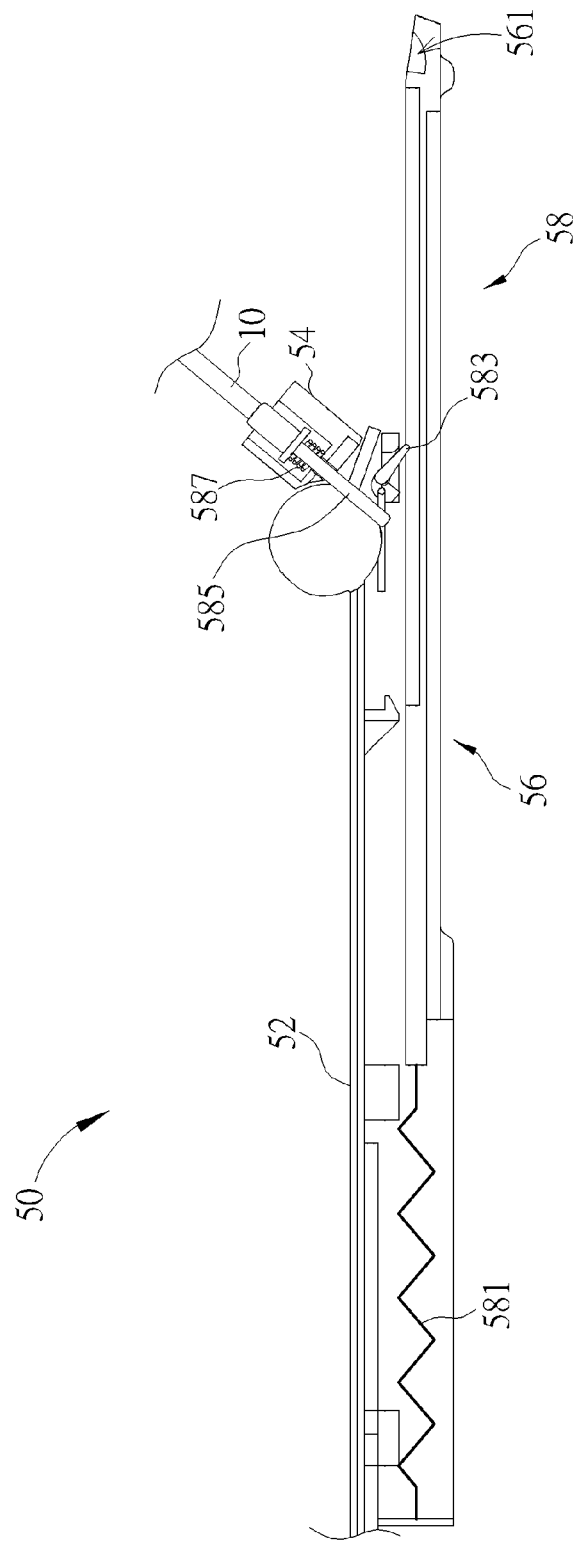

Please refer to FIG. 1 to FIG. 6. FIG. 2 and FIG. 3 are lateral diagrams of the portable electronic device 10 and the base 52 in different relative positions according to the embodiment of the present invention. FIG. 4 is a partial structural diagram illustrating that the portable electronic device 10 has not been inserted into the socket 54 according to the embodiment of the present invention. FIG. 5 and FIG. 6 are partial structural diagrams illustrating that the portable electronic device 10 is inserted into the socket 54 and the portable electronic device 10 and the base 52 are in different relative positions according to the embodiment of the present invention. The expansion dock 50 further includes a driving mechanism 58 for driving the expansion platform 56 to protrude from the side of the base 52 as the portable electronic device 10 is inserted into the socket 54 and the portable electronic device 10 is pivoted to a predetermined angle relative to the base 52. That is, as both conditions of that the portable electronic device 10 is inserted in the socket 54 and the portable electronic device 10 pivots to the predetermined angle relative to the base 52 are achieved, the driving mechanism 58 just can drive the expansion platform 56 to protrude from the side of the base 52.

According to this embodiment, the driving mechanism 58 includes a driving component 581, an engaging component 583, a pressing component 585 and a restoring component 587. The driving component 581 is installed inside the base 52 and for pushing the expansion platform 56 to protrude from the side of the base 52, and the driving component 581 can be a spring component. The engaging component 583 is pivotally installed inside the base 52 for engaging with a slot 561 of the expansion platform 56 so as to constrain a movement of the expansion platform 56. The pressing component 585 is installed inside the socket 54 for pushing the engaging component 583 to pivot . The restoring component 587 is connected to the pressing component 585 and is for driving the pressing component 585 to restore to an initial position shown in FIG. 4 as the portable electronic device 10 is detached from the socket 54, so as to prepare for a next actuation of the portable electronic device 10 being inserted into the socket 54 to drive the pressing component 585. The restoring component 587 can be a spring component.

As shown in FIG. 4, as the portable electronic device 10 has not been inserted into the socket 54, the portable electronic device 10 cannot press the pressing component 585. As shown in FIG. 2 and FIG. 5, as the portable electronic device 10 is inserted into the socket 54, the portable electronic device 10 can press the pressing component 585, the restoring component 587 is elastically deformed accordingly, and the engaging component 583 is engaged with the slot 561 of the expansion platform 56 so that the driving component 581 is not able to push the expansion platform 56 to move relative to the base 52. At this time, the driving component 581 can be elastically pressed.

As shown in FIG. 3 and FIG. 6, as the portable electronic device 10 is inserted into the socket 54 and the portable electronic device 10 and the socket 54 are pivoted to the predetermined angle relative to the base 52, the pressing component 585 pressed by the portable electronic device 10 can push the engaging component 583 to pivot so as to detach the engaging component 583 from the slot 561 of the expansion platform 56. At this time, the driving component 581 can release elastic energy for pushing the expansion platform 56 to protrude from the side of the base 52. That is, as the portable electronic device 10 has not been pivoted to the predetermined angle yet, the pressing component 585 can not push the engaging component 583 to pivot so as to detach the engaging component 583 from the slot 561 of the expansion platform 56. As the portable electronic device 10 pivots to the predetermined angle or an angle over the predetermined angle relative to the base 52, the expansion platform 56 protrudes from the side of the base 52. The predetermined angle depends on the practical design demand. For example, the expansion platform 56 protrudes from the side of the base 52 as the angle between the portable electronic device 10 and the base 52 exceeds 100 degree. Due to this mechanism design, as the portable electronic device 10 pivots to the predetermined angle relative to the base 52 and the expansion platform 56 protrudes from the side of the base 52, a center-of-gravity position of the portable electronic device 10 is located between a side of the expansion platform 56 away from the base 52 and the side of the base 52 for preventing the portable electronic device from being fallen. Therefore, a bottom area of the expansion dock 50 is increased and the center-of-gravity position can be changed so as to prevent the portable electronic device 10 from being fallen.

Figure 7:
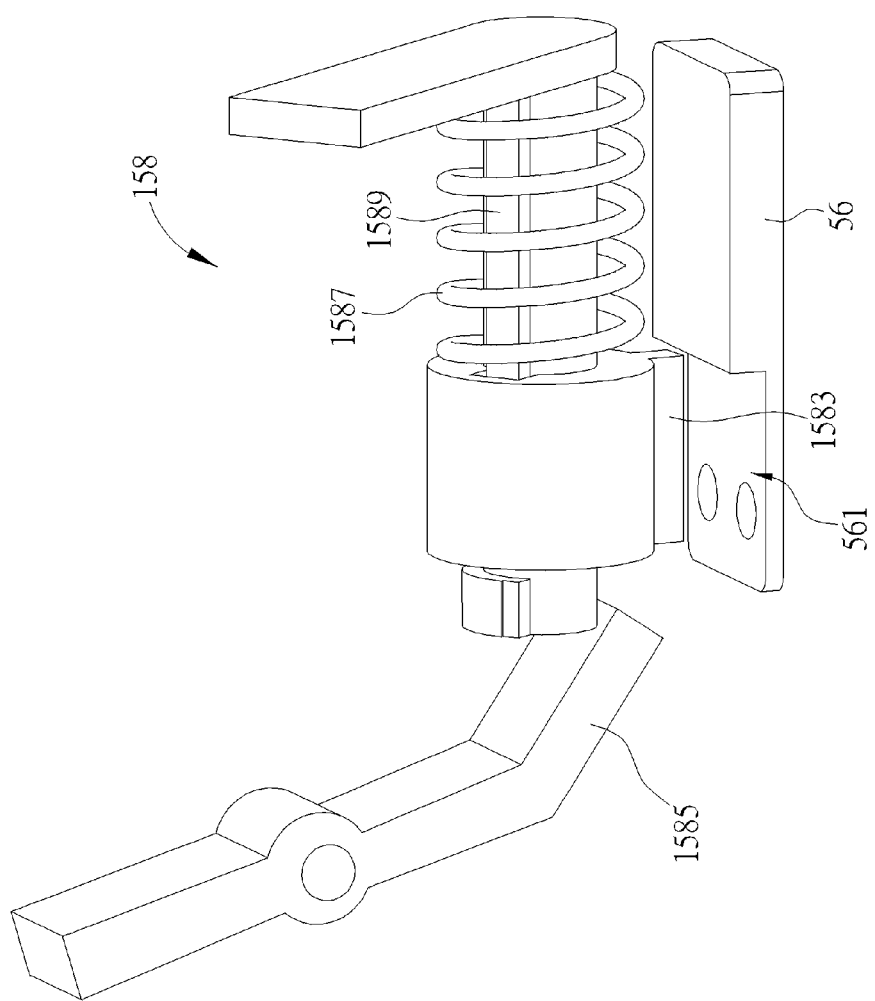
FIG. 7 is a structural diagram of a driving mechanism according to another embodiment of the present invention.

In addition, please refer to FIG. 1 to FIG. 7. FIG. 7 is a structural diagram of a driving mechanism 158 according to another embodiment of the present invention. The difference between this embodiment and the above-mentioned embodiment is an unlocking mechanism for unlocking the constraint of the expansion platform 56, and other operational principle is similar as one of the above-mentioned embodiment. The driving mechanism 158 includes the driving component 581, an engaging component 1583, a pressing component 1585, a restoring component 1587 and a pivoting component 1589. As same as the above-mentioned embodiment, the driving component 581 is installed inside the base 52 and for pushing the expansion platform 56 to protrude from the side of the base 52, and the driving component 581 can be a spring component. The difference between this embodiment and the above-mentioned embodiment is that the pivoting component 1589 is connected to the socket 54 and for driving the socket 54 to pivot relative to the base 52 according to this embodiment, and the pivoting component 1589 can be a hinge. The engaging component 1583 is connected to the pivoting component 1589 and rotates with the pivoting component 1589. The engaging component 1583 engages with the slot 561 of the expansion platform 56 so as to constrain a movement of the expansion platform 56. The pressing component 1585 is installed in the socket 54 and is pressed to drive the engaging component 1583 to engage with the slot 561 of the expansion platform 56 as the portable electronic device 10 is inserted into the socket 54. The restoring component 1587 is connected to the engaging component 1583 for restoring the engaging component 1583 to an initial position as the portable electronic device 10 is detached from the socket 54, so as to prepare for a next actuation of the portable electronic device 10 being inserted into the socket 54 to press the pressing component 1585 for driving the engaging component 1583. The restoring component 1587 can be a spring component.

According to this embodiment, as the portable electronic device 10 is inserted into the socket 54 and the pivoting component 1589 drives the socket 54 to pivot to the predetermined angle, the engaging component 1583 can rotate with the pivoting component 1589 to detach from the slot 561 of the expansion platform 56. That is, the unlocking mechanism of the engaging component 1583 is linked to the pivoting component 1589 for pivoting the socket 54. And then the driving component 581 drives the expansion platform 56 to protrude from the side of the base 52 so as to prevent the portable electronic device 10 from being fallen. In conclusion, the mechanism for driving the expansion platform 56 to protrude from the base 52 as the portable electronic device 10 is inserted into the socket 54 and the portable electronic device 10 pivots to the predetermined angle relative to the base 52 is within the scope of the present invention.

In addition, the expansion platform 56 protrudable from the base 52 can not only prevent the portable electronic device 10 from being fallen by increasing the bottom area of the expansion dock 50 and changing the center-of-gravity position of the expansion dock 50, but also dispose multifunction modules thereon, such as a display interface, an input interface, a speaker unit, an antenna unit or a media keyboard for providing different expansion functions. The multifunction modules can be operated as the expansion platform 56 protrudes from the side of the base 52. For example, as disposing a thin speaker on the expansion platform 56, the acoustic effect of the portable electronic system 100 can be enhanced as the expansion platform 56 protrudes from the side of the base 52, such as achieving a stereo effect. As disposing the display interface on the expansion platform 56, such as an electronic paper component, the display interface can be a secondary screen as the expansion platform 56 protrudes from the side of the base 52, and information not displayed on the portable electronic device 10 can be shown on the display interface. The antenna unit can also be disposed on the expansion platform 56 for enhanced wireless transmission as the expansion platform 56 protrudes from the side of the base 52. Which expansion functions of the expansion platform 56 are applied depends on the practical design demand, and it is not reiterated.

In contrast to prior art, the present invention is to provide the expansion dock and the portable electronic system therewith. As both conditions of that the portable electronic device is inserted into the socket and the portable electronic device is pivoted to the predetermined angle relative to the base are achieved, the expansion platform just can protrude from the side of the base, thus the bottom area of the expansion dock is increased and the center-of-gravity position can be changed, so as to prevent the portable electronic device from being fallen while rotating. In addition, multifunction modules can be disposed on the expansion platform, and the corresponding functions can be operated as the expansion platform protrudes from the side of the base. In conclusion, the present invention is to provide the expansion dock capable of utilizing the mechanical space effectively and capable of supporting the portable electronic device effectively without increasing any counterweight or decreasing a weight of the portable electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An expansion dock comprising:
    a base;
    a socket installed on a side of the base and pivoted to the base, a portable electronic device being inserted into the socket;
    an expansion platform installed inside the base and protrudable from the side of the base; and
    a driving mechanism for driving the expansion platform to protrude from the side of the base as the portable electronic device is inserted into the socket and the portable electronic device is pivoted to a predetermined angle relative to the base.

2. The expansion dock of claim 1, wherein a center-of-gravity position of the portable electronic device is located between a side of the expansion platform away from the base and the side of the base for preventing the portable electronic device from being fallen, as the portable electronic device is pivoted to the predetermined angle relative to the base and the extension platform protrudes from the side of the base.

3. The expansion dock of claim 1, wherein the driving mechanism comprises:
- a driving component installed inside the base and for pushing the expansion platform to protrude from the side of the base;
- an engaging component pivotally installed inside the base for engaging with a slot of the expansion platform so as to constrain a movement of the expansion platform; and
- a pressing component installed inside the socket for pushing the engaging component to pivot so as to detach from the slot of the expansion platform, so that the driving component pushes the expansion platform to protrude from the side of the base, as the portable electronic device is inserted into the socket and pivoted to the predetermined angle relative to the base.

4. The expansion dock of claim 3, wherein the driving mechanism further comprises a restoring component connected to the pressing component for restoring the pressing component to an initial position as the portable electronic device is detached from the socket.

5. The expansion dock of claim 4, wherein the restoring component is a spring component.

6. The expansion dock of claim 3, wherein the driving component is a spring component.

7. The expansion dock of claim 1, wherein the driving mechanism comprises:
- a driving component installed inside the base and for pushing the expansion platform to protrude from the side of the base;
- a pivoting component connected to the socket and for driving the socket to pivot relative to the base;
- an engaging component connected to the pivoting component and rotating with the pivoting component, the engaging component engaging with a slot of the expansion platform so as to constrain a movement of the expansion platform; and
- a pressing component installed in the socket and being pressed to drive the engaging component to engage with the slot of the expansion platform as the portable electronic device is inserted into the socket, and the engaging component being pivoted to detach from the slot of the expansion platform so that the driving component drives the expansion platform to protrude from the side of the base, as the portable electronic device is inserted into the socket and the pivoting component drives the socket to pivot to the predetermined angle.

8. The expansion dock of claim 7, wherein the driving mechanism further comprises a restoring component connected to the engaging component, the restoring component is for restoring the engaging component to an initial position as the portable electronic device is detached from the socket.

9. The expansion dock of claim 8, wherein the restoring component is a spring component.

10. The expansion dock of claim 7, wherein the driving component is a spring component.

11. The expansion dock of claim 1, wherein a display interface, an input interface, a speaker unit or an antenna unit is disposed on the expansion platform.

12. A portable electronic system comprising:
- a portable electronic device; and
- an expansion dock connected to the portable electronic device, the expansion dock comprising:
  - a base;
  - a socket installed on a side of the base and pivoted to the base, the portable electronic device being inserted into the socket;
  - an expansion platform installed inside the base and protrudable from the side of the base; and
  - a driving mechanism for driving the expansion platform to protrude from the side of the base as the portable electronic device is inserted into the socket and the portable electronic device is pivoted to a predetermined angle relative to the base.

13. The portable electronic system of claim 12, wherein a center-of-gravity position of the portable electronic device is located between a side of the expansion platform away from the base and the side of the base for preventing the portable electronic device from being fallen, as the portable electronic device is pivoted to the predetermined angle relative to the base and the extension platform protrudes from the side of the base.

14. The portable electronic system of claim 12, wherein the driving mechanism comprises:
- a driving component installed inside the base and for pushing the expansion platform to protrude from the side of the base;
- an engaging component pivotally installed inside the base for engaging with a slot of the expansion platform so as to constrain a movement of the expansion platform; and
- a pressing component installed inside the socket for pushing the engaging component to pivot so as to detach from the slot of the expansion platform, so that the driving component pushes the expansion platform to protrude from the side of the base, as the portable electronic device is inserted into the socket and pivoted to the predetermined angle relative to the base.

15. The portable electronic system of claim 12, wherein the driving mechanism further comprises a restoring component connected to the engaging component, the restoring component is for driving the engaging component to restore to an initial position as the portable electronic device is detached from the socket.

16. The portable electronic system of claim 12, wherein the driving mechanism comprises:
- a driving component installed inside the base and for pushing the expansion platform to protrude from the side of the base;
- a pivoting component connected to the socket and for driving the socket to pivot relative to the base;
- an engaging component connected to the pivoting component and rotating with the pivoting component, the engaging component engaging with a slot of the expansion platform so as to constrain a movement of the expansion platform; and
- a pressing component installed in the socket and being pressed to drive the engaging component to engage with the slot of the expansion platform as the portable electronic device is inserted into the socket, and the engaging component being pivoted to detach from the slot of the expansion platform so that the driving component drives the expansion platform to protrude from the side of the base, as the portable electronic device is inserted into the socket and the pivoting component drives the socket to pivot to the predetermined angle.

17. The portable electronic system of claim 16, wherein the driving mechanism further comprises a restoring component connected to the engaging component, the restoring component is for restoring the engaging component to an initial position as the portable electronic device is detached from the socket.

18. The portable electronic system of claim 12, wherein a display interface, an input interface, a speaker unit or an antenna unit is disposed on the expansion platform.

\* \* \* \* \*